Figure 1:
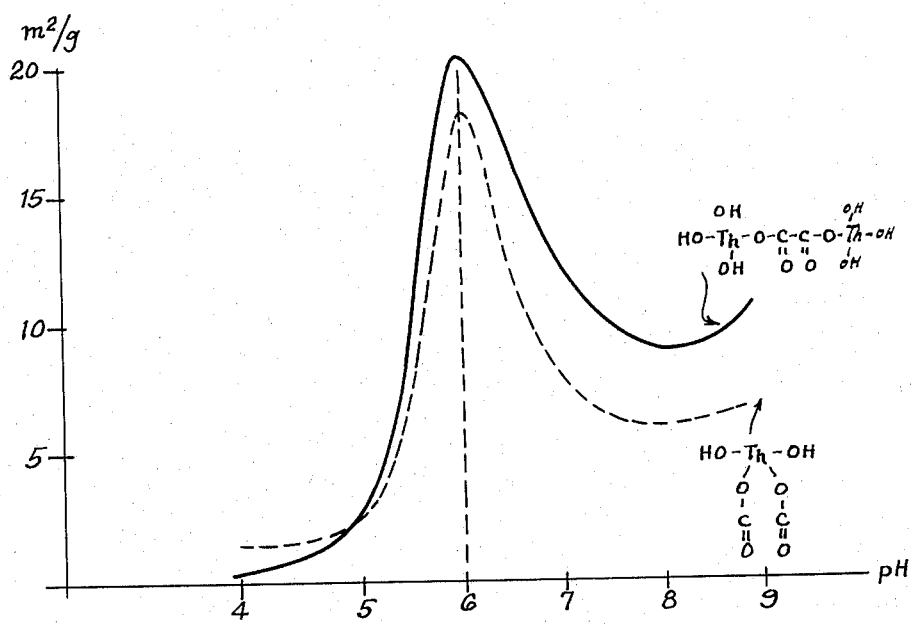

3,214,238
THORIUM OXIDES AND MIXED THORIUM
OXIDES AND METHOD
Paul Rombau and Marcel Peltier, La Rochelle, France, assignors to Pechiney, Compagnie de Produits Chimiques et Electrometallurgiques, Paris, France
Filed June 27, 1962, Ser. No. 205,593
Claims priority, application France, June 28, 1961, 866,337, 866,338
22 Claims. (Cl. 23—14.5)

This invention relates to the preparation of thorium oxides or oxides rich in thorium and it relates more particularly to the process for the preparation of thorium oxides of the type described having a large specific surface and other new and improved physical properties.

The oxides to which the present invention is addressed comprise an oxide system wherein at least 90% by weight of the oxide is thorium oxide and in which not more than 10% by weight of the remainder comprises one or more of the oxides of the metals of groups 2 to 8 of the periodical table and wherein such other metal oxides are thoroughly associated with the thorium oxide to provide a homogeneous composition having the characteristics of a solid solution.

It is an object of this invention to produce and to provide a method for producing thorium oxide or other oxide systems in which thorium oxide is the major component as previously described and to make application of the same as a catalyst support, as a catalytic agent, as a substance in the preparation of refractories and ceramics, and as a nuclear fuel component.

Another object of this invention is to produce a thorium oxide system of the type described having a high degree of specific surface.

A further object is to produce a new and improved industrial product of the thorium oxide system prepared in accordance with the practice of this invention.

These and other objects and advantages of this invention will hereinafter appear and for purposes of illustration, but not of limitation, an illustration of the invention is shown in the accompanying drawing in which—

FIG. 1 presents curves showing the relationship between the specific surface of thorium oxide prepared in accordance with the practice of this invention in relation to the pH of the suspension from which it is produced.

To the present, thorium oxides have been prepared by direct calcination of the salt of thorium such as the nitrate, sulfate, oxalate, acetate or thorium hydroxide. Thorium oxides prepared in this fashion have been found to vary widely in their physical characteristics depending somewhat upon the working procedures and conditions. Such physical characteristics, for example, as bulk density and the specific surface of nitrogen adsorption at −195° C., are not easily reproducible from batch to batch even under substantially the same processing conditions.

It has also been known to prepare products containing thorium oxide in combination with one or more other oxides of metals, either by admixture of the corresponding oxides of their salts followed by calcination or by coprecipitation of thorium oxide and the other oxides. The product secured by the techniques described constitute intimate mixtures of the oxides as distinguished from a homogeneous product having the characteristics of a solid solution.

It is an important concept of this invention to obviate the objectionable features of the processes and products heretofore known and to produce compositions of thorium oxide having a large specific surface or homogeneous mixtures of thorium oxide with other oxides having the characteristics of a solid solution.

The following example of the practice of this invention is given by way of illustration, but not by way of limitation:

EXAMPLE 1

*Preparation of thorium oxide*

Step (1): About 400 grams of freshly precipitated or prepared thorium oxalate is suspended in a liter of about 6 N-ammonia aqueous solution. Such freshly precipitated thorium oxalate may be secured by adding oxalic acid to a solution of thorium salt such as thorium nitrate, and the separated precipitate is washed with water for suspension while wet in the ammonia solution. The suspension is heated to about 65° C. for a time within the range of ½ to 2 hours, although more than 2 hours can be employed but without consequent advantage. During the heating of the suspension, oxalyl groups are replaced by hydroxyl groups to produce a thorium hydroxy-oxalate having in the vicinity of about 6 hydroxyl groups and 1

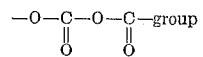

for two thorium atoms.

Step (2): The resulting thorium hydroxy-oxalate is separated from the aqueous solution, as by filtration, centrifuge or the like. The separated hydroxy-oxalate is suspended in an acid solution, preferably nitric acid, having a pH below 5 and preferably within the range of 2.5 to 3. The suspension is heated at a temperature within the range of 80–100° C. for about 10 minutes during which the crystalline shape is modified to produce small flat crystals of substantially rectangular or square shape.

Step (3): The solid crystals are removed from the acid solution, as by filtration or the like separation means, and then resuspended in water heated to a temperature between 50–65° C. The suspension, which is acidic in character, is neutralized with ammonia (ammonium hydroxide) (35 grams $NH_3$ per liter) in an amount to adjust the pH to between 6 and 9 when measured after stirring for about 10 minutes to stabilize the pH. It will be found that the resulting properties of the oxide subsequently to be prepared will depend greatly on the manner and extent of pH adjustment during this step of the procedure.

Step (4): The solids are removed from the ammonia neutralized solution, dried and then calcined such as by heating to a temperature within the range of 800–900° C. whereby the product is converted to thorium oxide ($ThO_2$).

The process described is capable of modifications without departing from the spirit of the invention. For example, the crystals obtained by acidification of the aqueous suspension of the hydroxy-oxalate may be neutralized directly with ammonia or ammonium hydroxide without separation of the crystals for re-suspension in the aqueous medium.

The specific surface of the thorium oxide obtained from the hydroxy-oxalate prepared in accordance with the practice of this invention will vary to a high degree depending upon the amount of pH adjustment of the suspension neutralized with ammonia during the third step of the preparation, as evidenced by the curve set forth in FIG. 1 presenting data on specific surface derived by the B.E.T. method (Brunauer-Emmett-Teller—Journal of American Chemical Society, vol. 60, p. 309, 1938).

In the drawing, the full line curve corresponds to the product secured from a hydroxy-oxalate having 6 hydroxyl groups per 1 oxalyl group. The broken line curve corresponds to the data derived from a hydroxy-oxalate having 2 hydroxyl groups per 1 oxalyl group. It will be observed that both curves evidence the same trend with a rather sharp maximum at a pH value of about 6 and with a flat minimum at a pH between 7.5 and 8. Thus the pH adjustment achieved in the neutralization of the suspension of the crystals in the third step of the process greatly influences the specific surface of the hydroxy-oxalate obtained by reaction of the thorium hydroxy-oxalate with ammonia.

The described method for the preparation of thorium oxide can also be employed in the preparation of oxide systems wherein thorium oxide is present in admixture with one or more water soluble or water insoluble oxides of metals; oxides of alkaline earth metals; or the oxides of metals having oxides or hydroxides which begin to precipitate at a pH above 5.

The other metal or metals are incorporated in the form of an acid solution of a salt, preferably the nitrate, to the acid suspension obtained in the third step of Example 1 for the preparation of thorium oxide. Thereafter, the operations are the same as described in Example 1. In the course of the addition of ammonia, the hydroxide or hydroxides of the other metal or metals respectively is absorbed concurrently with its formation and remains fixed in the crystalline lattice of the thorium hydroxy-oxalate. After the adjustment of the pH to between 6 and 9, depending upon the nature and the properties of the other metal oxides to be fixed in the thorium oxide, the separated material is washed and calcined, as in step (4) of Example 1, to produce the corresponding oxides in what appears to have the characteristics of a solid solution. Up to 10% by weight of such other oxides can be incorporated in the manner described in the combination with thorium oxide.

Thorium oxide and the mixed oxides and others of the metals previously indicated, when prepared in accordance with the practice of this invention, pose a specific surface of 5 to 20 m.$^2$/g. The value of the crystalline parameter is 5.6 A. and the density is between 2.5 and 3, depending upon the kind of constituents.

There are a number of metallic oxides that can be incorporated with the thorium oxide in the form of a solid solution prepared in accordance with the practice of this invention. By way of specific example, reference can be made to the mixed oxides of thorium and uranium wherein the uranium oxide component is present in an amount up to 5% by weight or specific reference can be made to a treble mixed oxide of thorium, uranium and an alkaline earth metal, such as calcium, magnesium, or strontium, containing about 0.1 to 1% by weight of the alkaline earth metal oxide and about 5% by weight of uranium oxide. Such mixed oxides have been found to be very important in the nuclear field. Thorium oxide alone and some of the mixed oxides of thorium and other metals have also found wide and important usage in the ceramics industry and as refractory materials.

Mixed oxides embodying the features of this invention exhibit exceptionally strong linkage between the various constituents. For example, mixed thorium and uranium oxide having 5% by weight uranium oxide is resistant to the liberation of uranium in the presence of cold 2 N-nitric acid and only 40% of the uranium is removed when exposed to warm 6 N-nitric acid.

EXAMPLE 2

Oxalic acid in solution in aqueous medium is introduced into a solution of thorium nitrate maintained at 70° C. and in an amount to effect precipitation of the thorium as thorium oxalate. The product is filtered for the removal of the precipitate and the precipitate is washed with water. 200 grams of the wet precipitate is suspended in 500 cm.$^3$ of 6 N-ammonia solution and the suspension is heated at 60° C. for about 30 minutes with stirring. The precipitate in the form of ammonium oxalate is removed by filtration and washed.

The wet hydroxy-oxalate is again suspended in 500 cm.$^3$ water and acidified with nitric acid to a pH of 2.5. The suspension is then heated to 90° C. for 10 minutes after which it is filtered and washed. The formed thorium hydroxy-oxalate is suspended in 300 cm.$^3$ water at 60° C. and it provides a suspension which is distinctly acid. Ammonia is added in the form of ammonium hydroxide in an amount to adjust the pH to 6 with continued agitation for 10 minutes.

The suspension is filtered and the separated precipitate is washed and then dried. It is thereafter calcined by heating for 2 hours at 850° C. whereby the precipitate is converted to relatively pure thorium oxide having a bulk density of 2.5 to 3 grams per cm.$^3$, a specific surface of 20.4 m.$^2$ per gram, as determined by the B.E.T. method.

EXAMPLE 3

The procedure of Example 2 is followed with the exception that the pH adjustment achieved by the addition of ammonia to the re-suspended precipitate of thorium hydroxy-oxalate, following nitric acid addition, is carried out to a pH of 7 instead of a pH of 6.

The product resulting from the calcination step has a specific surface of 11.9 m.$^2$ per gram.

EXAMPLE 4

The procedure of Example 2 is followed with the exception that the pH adjustment by the addition of ammonia to the re-suspended precipitate, following nitric acid addition, is carried out to a pH of 8 instead of 6.

The product resulting from the calcination step has a specific surface of 9.0 m.$^2$ per gram.

EXAMPLE 5

The procedure of Example 2 is followed with the exception that the pH adjustment by the addition of ammonia to the re-suspended precipitate, following nitric acid addition, is carried out to a pH of 9 instead of 6.

The product resulting from the calcination step has a specific surface of 11.3 m$^2$ per gram.

EXAMPLE 6

*Mixed thorium and uranium oxide*

The procedure described in Example 2 is followed to the point where the thorium hydroxy-oxalate is re-suspended in water at 60° C. after acidification with nitric acid. At this point, an aqueous solution of uranyl nitrate is added in an amount to provide a mixed oxide containing 5% uranium oxide as a product. 2 N-ammonia solution is added in an amount to adjust the pH to 6 with continuous mixing for about 10 minutes. It will be observed that the uranium is absorbed into the solids. The solids are removed by filtration, washed and dried, and then calcined by heating to 900° C. for about 2 hours. A solid solution of thorium and uranium oxide containing 5% uranium oxide is obtained having a bulk density of 2.9 grams per cm.$^3$, a specific surface of 19 m.$^2$ per gram, and a crystalline parameter of 5.595 A.

EXAMPLE 7

*Mixed thorium-uranium-calcium oxide*

The procedure as set forth in Example 2 is followed to the preparation of the thorium hydroxy-oxalate and its treatment with nitric acid. After the acidified suspension is cooled down to 60° C., calcium nitrate in aqueous solution and uranyl nitrate in aqueous solution are added in an amount to provide for 0.1% by weight calcium oxide and 5% by weight uranium oxide when calculated on the finished oxide product. The pH is adjusted to 7.5 by the addition of 2 N-ammonia solution and the suspension is agitated for 10 minutes at about 60° C. The solids are filtered out, washed and dried, and then calcined by heating to 900° C. for 2 hours. The product is characterized by a density of 2.8 grams per cm.$^3$, a specific surface of 10 m.$^2$ per gram, and a crystalline parameter of 5.59 A.

EXAMPLE 8

*Cobalt-calcium-thorium oxide*

The procedure of Example 7 is repeated with the exception that cobalt nitrate in aqueous solution is substituted for the uranyl nitrate and introduced in an amount so that the cobalt oxide in the final product will be 5% of the oxide product. The product resulting from the calcination at 900° C. for 2 hours will have a specific surface of about 10 m.$^2$ per gram.

It will be apparent from the foregoing that we have provided a new and improved means for the production of thorium oxide or mixed oxides of thorium and other metals of groups 2 to 8 in the periodic system having new and improved physical properties.

It will be understood that changes may be made in the details of formulation and preparation without departing from the spirit of the invention, especially as defined in the following claims.

We claim:

1. A process for the preparation of thorium oxide having a large specific surface comprising adding thorium oxalate to a concentrated solution of aqueous ammonia and heating the solution to convert the thorium oxalate to thorium hydroxy-oxalate, recovering thorium hydroxy-oxalate from the solution, acidifying the corresponding thorium hydroxy-oxalate in aqueous suspension to a pH of less than 5, heating the suspension to produce flat crystals of substantially rectangular shape, adjusting the pH of the acidified hydroxy-oxalate in aqueous suspension to between 6 and 9 with stirring to provide a precipitate of thorium hydroxy-oxalate, separating the precipitate, and heating the separated precipitate to calcination temperature whereby the thorium hydroxy-oxalate is converted to thorium oxide.

2. A process for the preparation of thorium oxide with a large specific surface comprising reacting thorium oxalate with a hot concentrated solution of aqueous ammonia whereby the thorium oxalate is converted to thorium hydroxy-oxalate, recovering thorium hydroxy-oxalate from the ammonia solution, acidifying the hydroxy-oxalate in aqueous suspension to a pH less than 5, heating the suspension to produce flat, substantially rectangular crystals, adjusting the pH of the acidified hydroxy-oxalate in aqueous suspension to between 6 and 9 with stirring to provide a precipitate of thorium hydroxy-oxalate, separating the precipitate and calcining the separated precipitate whereby the thorium hydroxy-oxalate is converted to thorium oxide.

3. A process for the preparation of thorium oxide having a large specific surface comprising adding thorium oxalate to a concentrated solution of aqueous ammonia and heating the solution to convert the thorium oxalate to throium hydroxy-oxalate, recovering thorium hydroxy-oxalate from the ammonia solution, acidifying the corresponding thorium hydroxy-oxalate in aqueous suspension to a pH between 2.5 and 3, heating the suspension to produce small, flat, substantially rectangular crystals, adjusting the pH of the acidified hydroxy-oxalate in aqueous suspension to between 6 and 9 with stirring to provide a precipitate of thorium hydroxy-oxalate, separating the precipitate, and heating the separated precipitate to calcination temperature whereby the thorium hydroxy-oxalate is converted to thorium oxide.

4. The process as claimed in claim 1 in which the acidification step is accompanied with heating for at least ½ hour at a temperature between 80–100° C.

5. The process as claimed in claim 1 in which the acidified hydroxy-oxalate re-suspended in aqueous medium is adjusted in pH to between 6 and 9 with ammonia.

6. The process as claimed in claim 5 in which the pH adjustment with ammonia is conducted while stirring for about 10 minutes.

7. The process as claimed in claim 1 in which pH adjustment is effected with ammonia while at a temperature of about 60° C.

8. The process as claimed in claim 1 in which the separated precipitate is washed and dried before calcining.

9. The process as claimed in claim 1 in which the heating step to calcine the thorium hydroxy-oxalate is carried out at a temperature of 800–900° C.

10. A process for the preparation of the mixed oxides of thorium and up to 10% by weight of the oxides of other metals selected from the group consisting of the metals of groups 2 to 8 of the periodic table comprising reacting thorium oxalate with a solution of ammonia wherein the oxalate is converted to thorium hydroxy-oxalate, recovering thorium hydroxy-oxalate from the ammonia solution, acidifying the thorium hydroxy-oxalate in aqueous suspension to a pH of less than 5, heating the suspension to produce small, flat, substantially rectangular crystals, separating the thorium hydroxy-oxalate from the acidified suspension, suspending the separated thorium hydroxy-oxalate in aqueous medium, adding an aqueous solution of the soluble salt of the other metal, adjusting the pH to between 6 and 9 with stirring to provide a precipitate, separating the precipitate, and heating the precipitate to calcination temperature to convert the precipitate to a solid solution of thorium and the other metal oxide.

11. The process as claimed in claim 10 in which the thorium oxalate is reacted with a hot concentrated solution of aqueous ammonia in the production of the thorium hydroxy-oxalate.

12. The process as claimed in claim 10 in which acidification of the thorium hydroxy-oxalate is carried out in an amount to adjust the pH to 2.5 to 3.

13. The process as claimed in claim 10 in which the acidification step is carried out with heating for at least ½ hour at a temperature of 80–100° C.

14. The process as claimed in claim 10 in which the soluble salt of the other metal introduced into the re-suspended thorium hydroxy-oxalate comprises the metal nitrate.

15. The process as claimed in claim 10 in which adjustment of the pH to between 6 and 9 is effected by ammonia.

16. The process as claimed in claim 10 in which calcination is carried out by heating of the separated product to a temperature between 800–900° C.

17. The process as claimed in claim 10 in which the other metal salt introduced into the suspension of thorium hydroxy-oxalate comprises a salt of uranium.

18. The process as claimed in claim 17 in which the uranium salt is introduced in an amount to provide about 5% uranium oxide in the oxide product and in which pH adjustment is carried out to between 6 and 9 with ammonia.

19. The process as claimed in claim 10 in which the salt of the other metals introduced into the suspension of thorium hydroxy-oxalate comprises the salts of calcium and uranium in an amount to provide 5% by weight uranium oxide and 0.1 to 1% by weight calcium oxide in the final product.

20. The process as claimed in claim 19 in which pH adjustment for the system of thorium, uranium and calcium oxide is effected to within the range of 7 to 9.

21. The process as claimed in claim 10 in which the salt of the other metal introduced into the suspension of the thorium hydroxy-oxalate comprises a water soluble salt of cobalt in an amount to provide 2–10% by weight cobalt oxide in the final product.

22. The process as claimed in claim 10 in which the salts of the other metals introduced into the suspension of thorium hydroxy-oxalate comprise the water soluble salts of cobalt and an alkaline earth metal in an amount to provide 2–10% by weight cobalt oxide and 0.1–1% by weight alkaline earth metal oxide in the final product.

References Cited by the Examiner
UNITED STATES PATENTS

| | | | |
|---|---|---|---|
| 2,099,325 | 11/37 | Zellmann et al. | 23—14.5 |
| 2,202,637 | 5/40 | Muller et al. | 23—14.5 |

CARL D. QUARFORTH, *Primary Examiner.*